Aug. 2, 1927.
B. F. SCHMIDT
1,637,593
SELECTIVE TRANSMISSION MECHANISM
Original Filed May 12, 1919      6 Sheets-Sheet 1
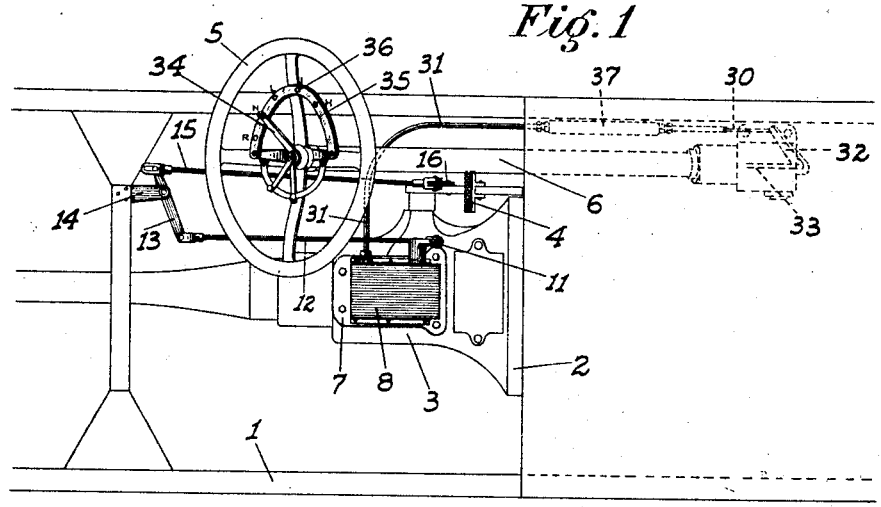
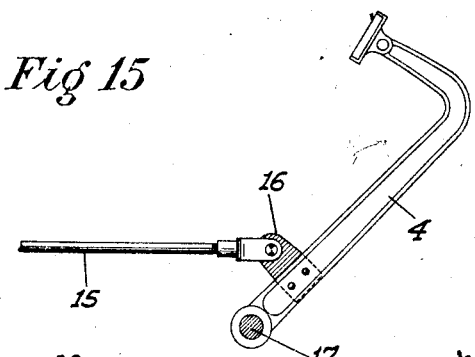
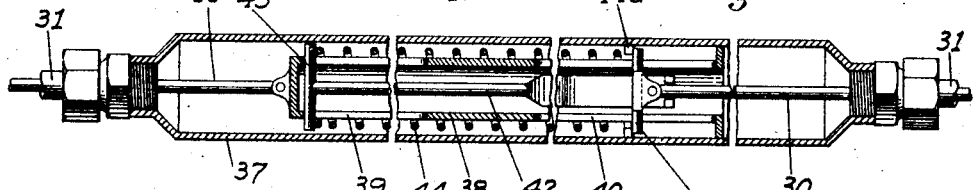
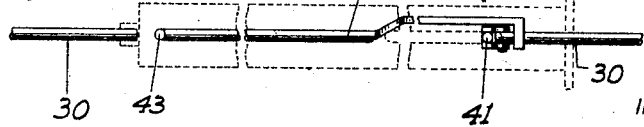
INVENTOR
B.F. Schmidt
BY
Berry S. Webster
ATTORNEY

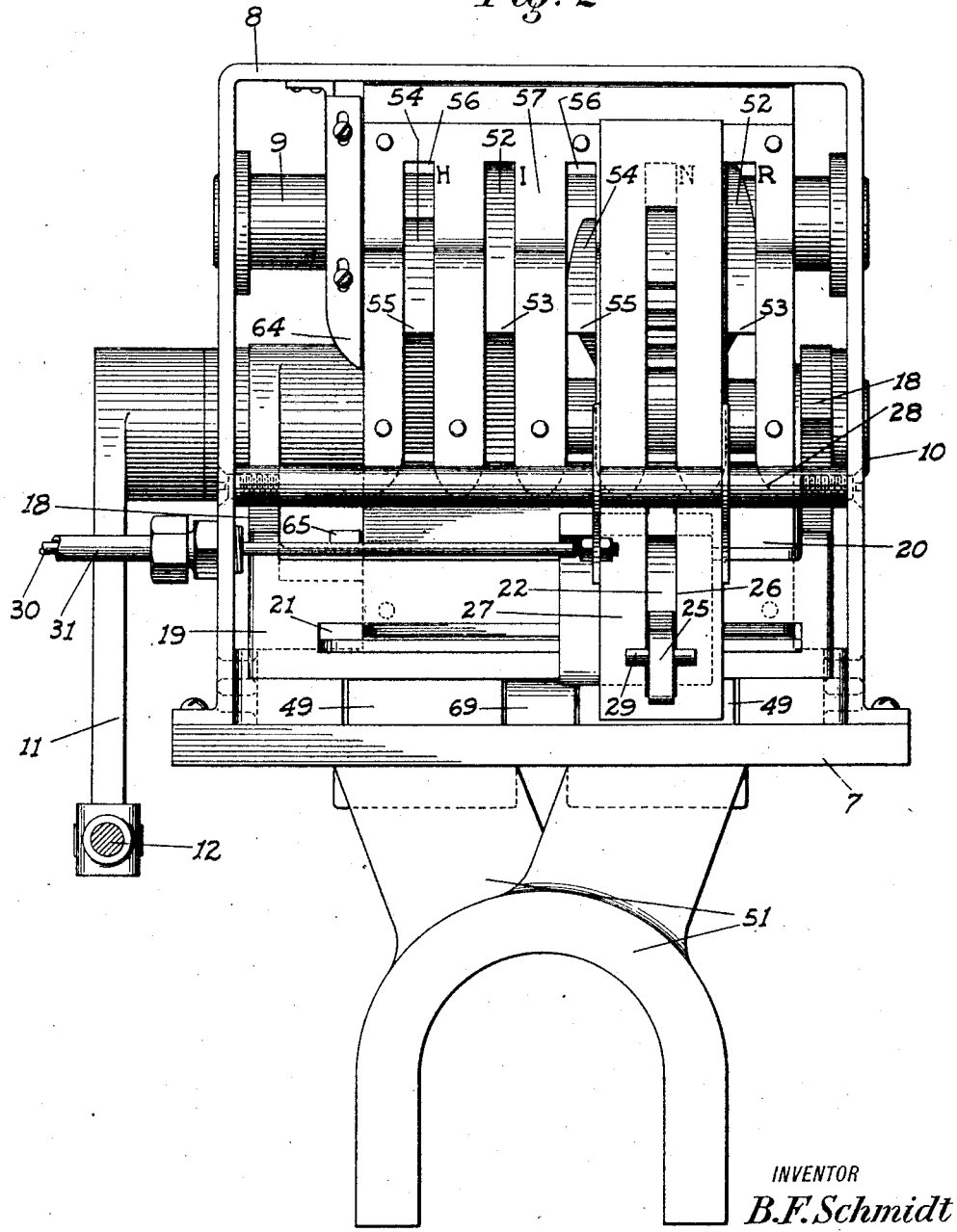

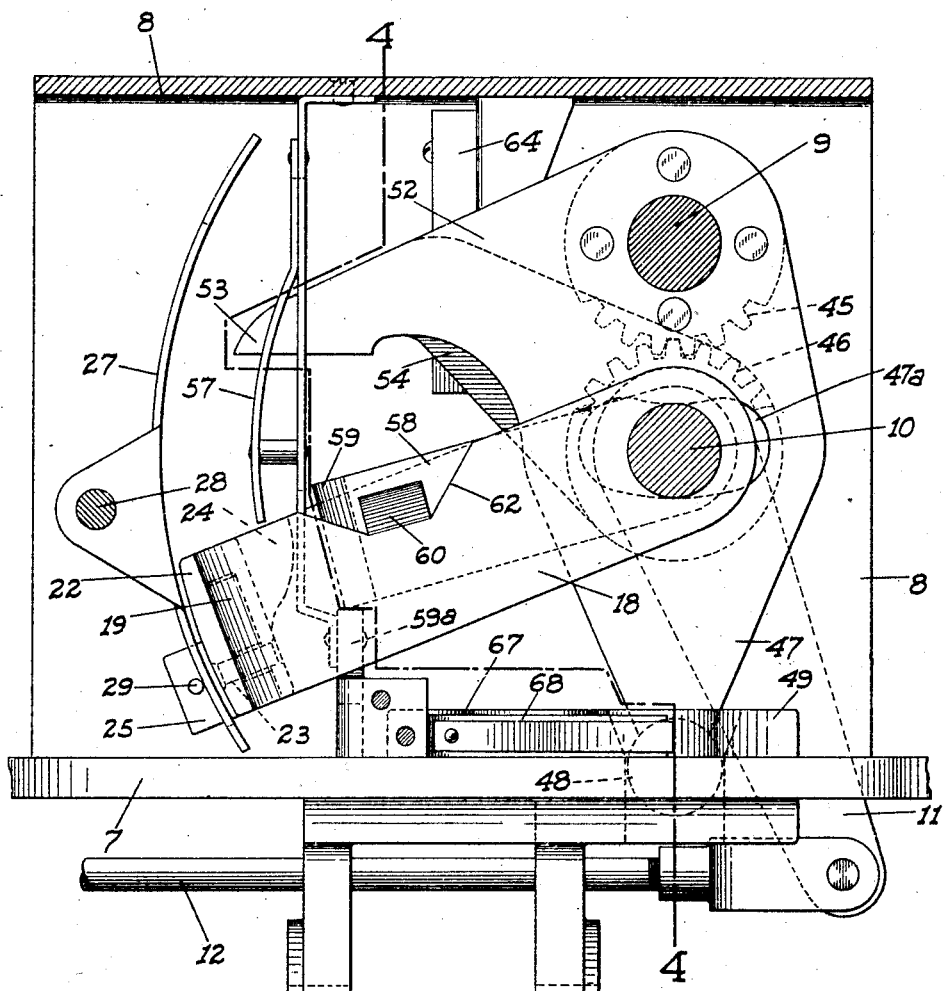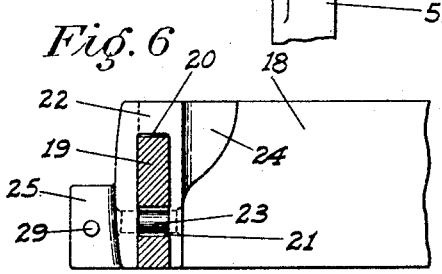

Aug. 2, 1927.

B. F. SCHMIDT 1,637,593

SELECTIVE TRANSMISSION MECHANISM

Original Filed May 12, 1919      6 Sheets-Sheet 4

INVENTOR
*B. F. Schmidt*
BY
*Perry S. Webster*
ATTORNEY

Aug. 2, 1927.

B. F. SCHMIDT 1,637,593

SELECTIVE TRANSMISSION MECHANISM

Original Filed May 12. 1919   6 Sheets-Sheet 5

INVENTOR
B. F. Schmidt
BY
Perry S. Webster
ATTORNEY

Aug. 2, 1927.

B. F. SCHMIDT 1,637,593

SELECTIVE TRANSMISSION MECHANISM

Original Filed May 12, 1919    6 Sheets-Sheet 6

INVENTOR
B.F.Schmidt
BY
Perry S. Webster
ATTORNEY

Patented Aug. 2, 1927.

1,637,593

UNITED STATES PATENT OFFICE.

BENJAMIN F. SCHMIDT, OF EXETER, CALIFORNIA, ASSIGNOR TO KING C. GILLETTE AND BENJAMIN F. SCHMIDT, COPARTNERS, DOING BUSINESS AS GILLETTE-SCHMIDT GEAR SHIFT COMPANY, OF LOS ANGELES, CALIFORNIA.

SELECTIVE TRANSMISSION MECHANISM.

Application filed May 12, 1919, Serial No. 296,385. Renewed January 25, 1922. Serial No. 531,734.

This invention relates to gear shifting mechanisms for motor vehicles and particularly to improvements in that type shown in Letters Patent No. 1,200,431 granted me the 3rd day of October, 1916.

The principal object of the present invention is to arrange a gear shifting mechanism of the type described in the above named patent so that it will be positioned on and connected to the transmission case of the vehicle and have direct connection with the shifting forks therein while doing away with the side or center levers now commonly used.

A further object is to simplify the construction as heretofore shown and yet retain the essential features thereof.

Another object is to provide a means for preventing the danger of the gears being stripped by the accidental displacement of the selective lever on the steering wheel quadrant.

These objects, I accomplish by means of such structure and relative arrangement of the parts as will fully appear by a perusal of the following specification and claims.

On the drawings, similar characters of reference indicate corresponding parts in the several views.

Fig. 1 is a fragmentary plan view of a motor vehicle chassis, showing the location of my improved gear shifting mechanism and cooperating parts thereon.

Fig. 2 is a rear end elevation of the gear shifting mechanism.

Fig. 3 is a right side elevation thereof, with that side of the casing removed.

Fig. 6 is a fragmentary view showing a gear lever-arm selecting finger.

Fig. 15 is a side elevation of a clutch pedal and attachment thereon.

Fig. 16 is a sectional elevation of a spring controlled means interposed in the finger operating rod to prevent bending or breaking the same with possible misuse.

Fig. 17 is a top plan view of the connected rods shown in Fig. 16.

Figure 4:
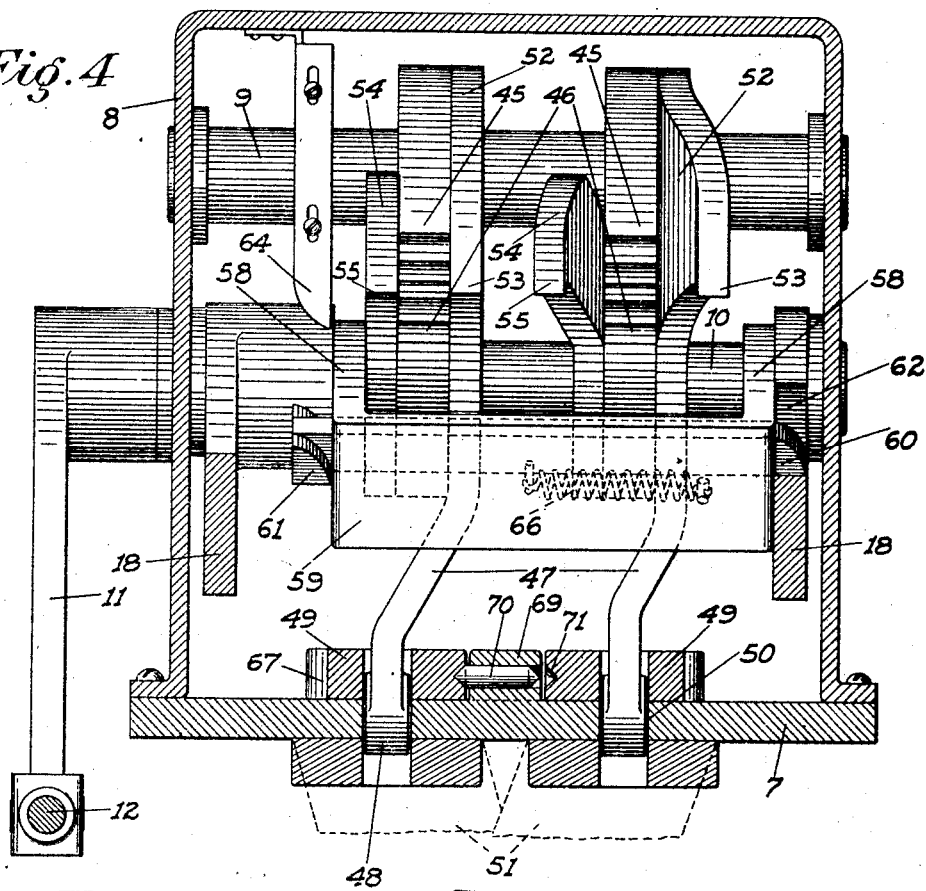
Fig. 4 is a rear end section taken on a line 4—4 of Fig. 3.
Figure 7:
Fig. 7 is a sectional view through a gear and arm attached thereto.
Figure 8:
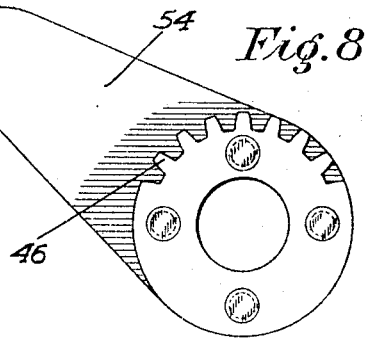
Fig. 8 is a side elevation of the same.
Figure 5:
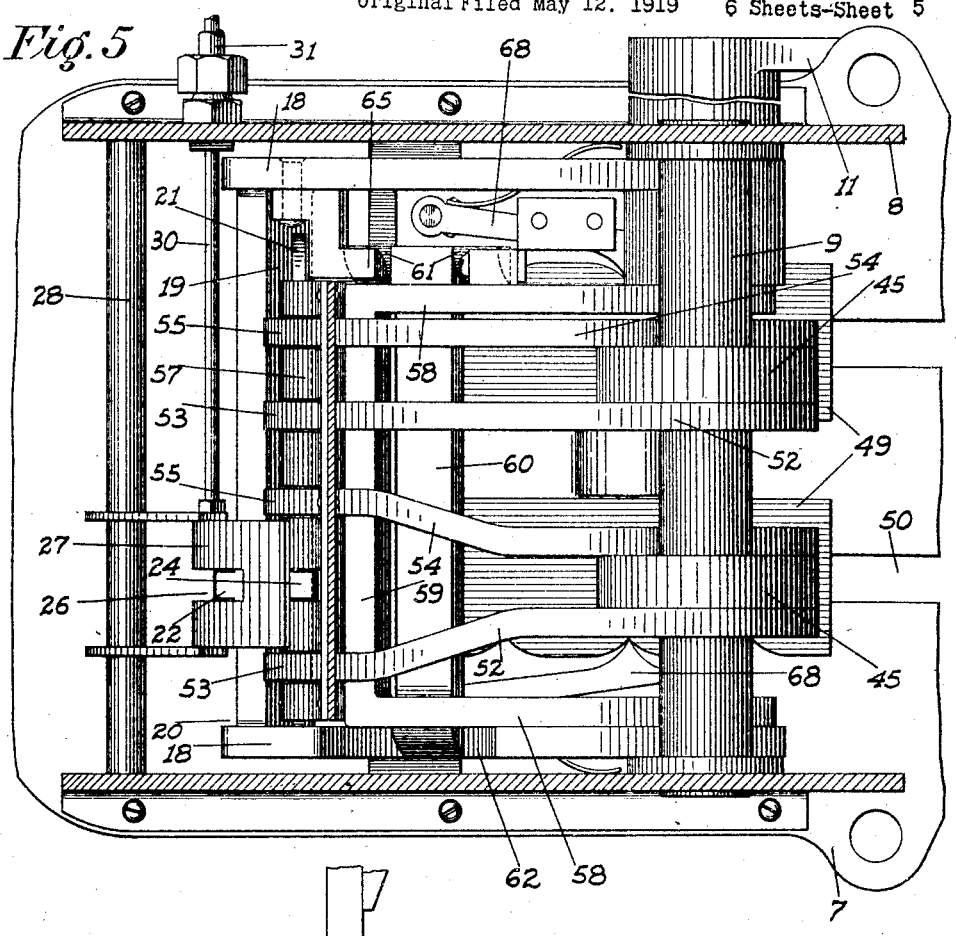
Fig. 5 is a top plan view of the same with the top of the casing removed.
Figure 9:
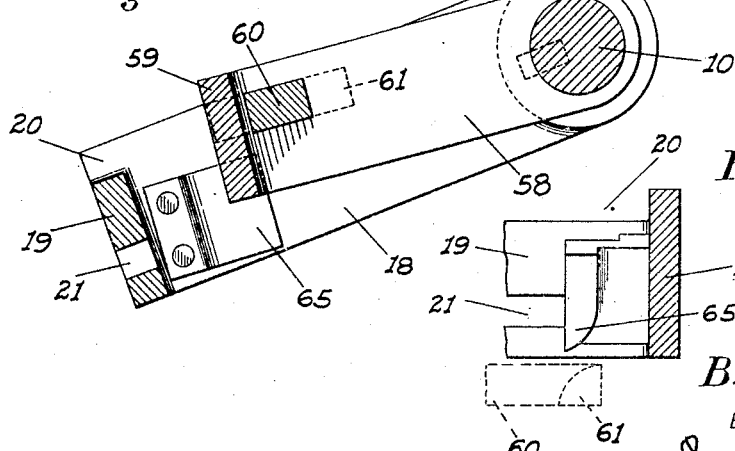
Fig. 9 is a fragmentary section through the neutralizer and finger actuating bars.
Figure 10:
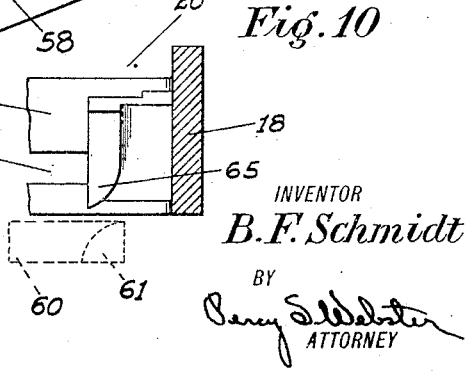
Fig. 10 is a fragmentary view of a neutralizer-bar key-trip.

Referring now more particularly to the figures of reference on the drawings, the numeral 1 indicates the frame of a motor vehicle having a power plant 2, a transmission box 3 thereon, a clutch pedal 4 and steering wheel 5 on the usual steering column 6. Adapted to cover and be positioned and secured on the top of the transmission box 3 is a plate 7, on which is mounted a substantially rectangular casing 8. Turnably mounted in the casing transversely thereof are shafts 9 and 10, arranged in spaced vertical relation, the lower shaft 10 projecting beyond the casing on the side thereof nearest the pedal 4 and having an arm 11 depending downwardly therefrom on such projecting end.

A rod 12 connects this arm to one end of a lever 13 fulcrumed to the frame 1, as at 14, the other end of the lever being connected to a rod 15 leading to a plate 16 on the pedal 4 above the pivotal shaft 17 thereof.

The connection of the rod 15 with the lever 13 allows of a certain movement of the rod 15 before any movement is imparted to the lever 13, for a purpose as will appear. Secured to the shaft 10 just inside the casing 8 are arms 18 projecting rearwardly and formed integral with a bar 19. This bar is provided with a groove 20 in its upper edge and a slot 21 near its lower edge, both running lengthwise of the arm 19. Slidable in the grove 20 and extending over both faces of the arm 19 is a selective finger member 22, which is held in position on the arm by a rivet 23 passing through the slot 21. The edge of the member 22 nearest the shaft 10 is provided with a finger 24, while the other edge is provided with a lug 25 adapted to project through and slide in a vertical slot 26 provided in a narrow plate 27 curved concentric with the shaft 10. This plate is slidably mounted on a rod 28 mounted in the casing 8 transversely thereof. The concentric positioning of the plate 27 relative to the shaft 10 is maintained by a pin 29 in the lug 25, thus keeping the plate between this pin and the member 22.

The plate 27 is adapted to be moved along the rod 28 by means of a flexible rod 30 secured thereto, which rod passes through a sleeve 31 to a point adjacent the lower end of the steering column 6, at which point it terminates and the rod 30 emerging therefrom is connected to a lever arm 32, from which a rod 33 passes alongside or in the column 6 to the wheel 5. A small arm 34 adaptable to be moved by the fingers is connected to the rod 33 at this end, having movement over a quadrant 35 having indicating points 36 designating the high, intermediate, low, neutral and reverse positions for the gears.

Interposed at any suitable point in the length of the sleeve 31 is a tubular casing 37. Inside the casing the rod 30 is broken, and the forward end is attached to a tube 38 having opposed slots 39 at the forward end and similar slots 40 at the rear end. The other end of the rod 30 in the tube 37 is secured to a transverse pin 41 slidable in the slots 40 and normally central of their length. Slidable over the rod 30 behind the pin 41 is a bar 42 having a transverse pin 43 thereon slidable in the slots 39 and normally positioned in the forward end of the slot. A spring 44 of suitable tension extends over the tube 38 between the pins 41 and 43 which project beyond the tube 38. This spring bears against the pin 43 and against lugs 44$^a$ depending from the tube 37 adjacent the pin 41, allowing the latter to pass by.

Should there be an obstruction tending to prevent the finger 24 from sliding on the bar 19, as will be shown hereafter, a pull on the rod 30 from the quadrant will cause the bar 42 to advance and the spring 44 to be compressed without pulling the tube 38 or the other end of the rod 30 forward. Similarly, if the rod 30 is pushed while said obstruction is present, the pin 41 will be moved back against the tension of the spring 44, allowing the bar 42, the tube 38 and the other end of the rod 30 to remain stationary. Normally, however, a pull or push on the rod 30 is transmitted through the rod without any compression of the spring 44, the same being of sufficient stiffness to permit of this being done.

Referring back now to the casing 8, and particularly to Figs. 2, 3, 4 and 5 of the drawings, the shaft 9 has a pair of spaced gears 45 turnable thereon meshing with gears 46 similarly mounted on the shaft 10. Each of the gears 45 has secured thereto an arm 47 depending downwardly therefrom and slotted as at 47$^a$ to permit movement of the same about the shaft 10. The lower ends of these arms terminate in knobs 48 movably seated in plates 49 slidable in slots 50 in the plate 7, these plates 49 being secured to the respective forks 51 of the transmission gears. The vertical position of these arms 47 being neutral, a movement of one of them will give, say, low or reverse positioning of the gears, and a similar movement of the other arm 47 will give the intermediate and high position of the transmission gears, or as the case may be.

Each of the arms 47 has another arm 52 thereon terminating in a nose 53, flat and normally horizontal on its under side and adapted for contact with the finger 24 at predetermined times.

Arms 54 are secured to the gears 46 on the shaft 10 also projecting toward the finger 24 and terminating in noses 55 similar to the noses 53 and normally on a line therewith. These noses project through vertical and spaced slots 56 in a plate 57 secured to the casing 8, these slots being open on the lower ends to permit the finger 24 to slide therein but to pass under the plate 57. While there are four of such arms, one each for high, intermediate, low and reverse gear positions, there are five slots, the extra one being for the neutral position of the gears. The finger 24 may be positioned to ride in this slot, but of course does not strike against any of the arm-noses in this slot.

Turnably mounted on the shaft 10 are a pair of arms 58, one of the same being adjacent one of the arms 18 but the other being spaced somewhat from the other arm 18. These arms are formed integral with a cross bar 59 and extend to a point just inside the slotted plate 57. This member I term the neutralizer, and it normally rests on the edge of a cross plate 59$^a$ projecting up from the plate 7. Slidably mounted in the arms 58 and extending lengthwise of the bar 59 is a key 60 having a T head 61 thereon projecting just beyond the arm 58 farthest from the corresponding arm 18. The other end projects through the other arm 58 and rests on the arm 18 at that end, there being a depression 62 cut in said arm 18 to receive the end of the key. The T-heads 61 of the key are curved away from the arm 18 as at 63, one of such curved portions being adapted to engage a cam-trip 64 depending vertically from the casing 8, the action of this trip being to slide the key from contact with the arm 18 when the arms 18 are raised a predetermined distance. The other one of the T-heads of the key 60 is adapted to engage a cam trip 65 secured to the arm 18 at that end when the said arm passes above the key after the tripping thereof by the trip 64 and the release thereby of the arm 18, as will be shown in the operation of the device hereinafter.

The normal position of the key 60 is maintained by means of a helical spring 66 secured at one end to the bar 59 and at the other end to the key.

Figure 11:
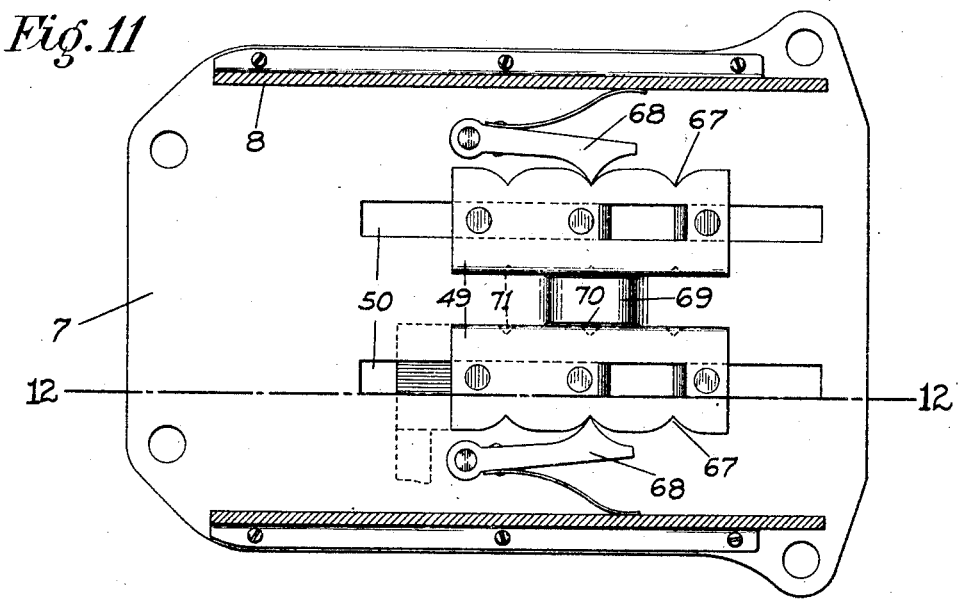
Fig. 11 is a top plan view of the bottom plate of the casing showing the sliding connections to the shifting forks and the means of locking the same.
Figure 12:
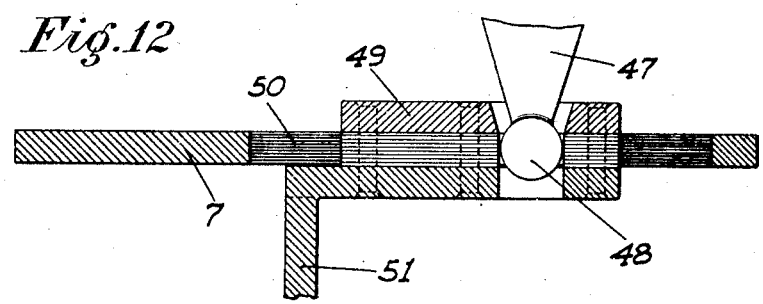
Fig. 12 is a sectional elevation taken on a line 12—12 of Fig. 11.
Figure 13:
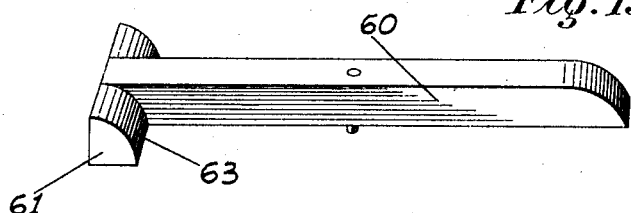
Fig. 13 is a perspective view of a neutralizer bar key.
Figure 14:
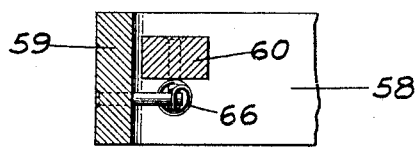
Fig. 14 is a fragmentary section through the neutralizer bar showing the key and spring therefor.

In order to form a locking means for the gear forks 51 when set in any desired position, the slidable plates 49 (see Figs. 11 and 12) are each provided with three notches 67 adapted to receive the tip of a spring-pressed pawl 68 therein, the position of each such notch of course being relative to the position of the forks when shifted to change gears.

To provide against the possibility of one of the plates 49 moving when the other is likewise being shifted I provide a boss 69 on the plate 7, between the plates 49, in which boss is a slidable pin 70 (see Fig. 4) having its ends pointed and hardened and adapted to project into one of three recesses 71 provided in each of the plates 49, opposite the notches 67 therein. The pin 70 has a length equal to the width of the boss 69 plus the depth of one of the recesses 71, so that when either plate 49 is slid along by the movement of its corresponding arm 47, the end of the pin in its recess in that plate will be forced therefrom and into the similar recess in the other plate, thus holding the latter against undesired movement as long as the first named plate is travelling from one position to the other.

The operation of the device is as follows:—Let us suppose that it is desired to place the gears in the transmission box in reverse, which we will assume is controlled by that arm 52 projecting through the slot 56 marked "R" at the extreme right of Fig. 2. As shown in the drawings, the device is in neutral position, the finger 24 being in line with the second slot from the right on Fig. 2; which is the extra slot reserved for the purpose, as heretofore explained.

As a first operation, the selector arm 34 on the quadrant 35 on the steering wheel is moved to the reverse notch thereon.

This action moves the rod 30 and causes the plate 27 carrying the finger member 24 to be positioned in alignment with the "R" slot 56 in the plate 57. The clutch pedal 4 is then pressed, the first portion of the travel of the same being to release the engine clutch and imparting no motion to the arm 12, owing to the slotted yoke on the end of the rod 15. As soon as the clutch is thrown out, however, the lever 13 is moved, which pulls the arm 11 attached to the shaft 10 in the casing 8. This movement turns this shaft and causes the arms 18 to raise, carrying the finger member 24 therewith up into the "R" slot 56 till the said finger member 24 engages the nose 53 on the arm 52, carrying the same upward, and so causing the arm 47 to move the plate 49 and fork 51 secured thereto into the reverse position of the gears in the transmission case. As soon, however, as the arm 52 starts to move, the intermeshing pair of gears 45 and 46 cause the arm 54 to move downwardly. Also, just before the finger member 24 impinges against the nose 53 of the arm 52, the head 61 of the key 60 on the neutralizer 58—59, which moves upwards with the arms 18, strikes the trip 64 and the key moves away from contact with the arm 18, thus permitting the arms 18 to pass by the neutralizer member to complete its travel, the neutralizer returning to its normal resting position on the plate 59ª. When the arm 52 has been moved upward to set the fork 51 in reverse position, the pressure on the pedal 4 is released, and the arms 18 drop to their normal position. The key 60, however, having slid back to its normal position by reason of the pull of the spring 66, must again be pulled out to permit the arms 18 to pass by. This is done by means of the trip 65 on one of the arms 18 as previously described.

The purpose and action of the neutralizer is as follows:—

Suppose it is desired to shift from reverse to low, and the finger member 24 so positioned. The setting of the previous arrangement of the gears leaves the arm 52 raised and the corresponding arm 54 depressed. As soon as the arms 18 move upwards, the bar 59 of the neutralizer engages this depressed arm 54 and raises it, and consequently lowers the arm 52, to the normal horizontal level of their noses 55 and 53, respectively, which is the neutral position of these arms. This is accomplished before the release and drop of the neutralizer by the action of the trip 64 on the key 60 thereof.

It will of course be evident that the finger member 24 pressing against the arm 52 will move the arm 47 to the left (on the drawing) while a similar pressing of the finger on the arm 54 will move the arm 47 to the right, owing to the intermeshing of the gears 45 and 46.

The action of either one of the arm units is of course the same.

Regarding the uses of the spring device interposed in the rod 30, as shown in Fig. 16, and heretofore described its purpose is as follows:—

When the driver presses down on the clutch pedal 4, the finger member 24 travels up any one of the slots 56 and of course remains there while the foot is kept on the pedal. Now were the driver to attempt to move the selector arm 34 on the steering wheel while so keeping his foot on the pedal, the strain would probably break or twist the rod 30 or some of the parts connected thereto. By the interposition of the spring device shown, however, this motion is temporarily taken up by the spring, until the release of the foot pedal, when the rod 30 will spring to whatever position was designated on the quadrant 35, as the said release of the foot pedal throws the member 24 below the level of the slots 56 and permits free transverse travel of the same.

Thus, from the foregoing description it will readily be seen that I have produced such a device as substantially fulfills the objects of the invention as set forth herein.

While this specification sets forth in detail the present and preferred construction of the device, still in practice, such deviations from such detail may be resorted to as do not form a departure from the spirit of the invention, as defined by the appended claims.

Having thus described my invention, what I claim as new and useful and desire to secure by Letters Patent is:—

1. In a gear shift mechanism including a casing, a plate having a plurality of open ended slots positioned therein, arms mounted in said casing, gear shift forks operatively connected therewith to move the same and having their ends projecting through the slots in the plate, actuating means for the arms and gear shifting forks, means for selecting any of said arms, a member slidably mounted in the casing adapted to move into any of the slots to select a gear change, an operating means mounted on the steering wheel of the vehicle, operative connections between the slidable member and said operating means, a sleeve surrounding the connecting means, said connecting means being parted therein and spring means in the sleeve connected to the parted ends whereby movement of one end of connecting means in either direction when the other end is held against movement, will cause the spring means to compress until such last named end is free to move.

2. In a gear shifting mechanism including a set of shafts, arms on each shaft normally terminating in the same line, the arms on one shaft being gear connected with corresponding arms on the other shaft, means for selecting any of said arms, means for then moving the same in one direction whereby the corresponding arm is moved in the opposite direction, and means for bringing the arm back to normal alignment before another selected movement may take place.

3. In a gear shifting mechanism including a pair of vertically spaced shafts, substantially horizontal arms on each shaft, the arms on one shaft being gear connected with the corresponding arms on the other shaft, means for selecting any of said arms, a frame secured to one of the shafts transversely of the arms and carrying the selecting means therein and adapted to move upwards to engage the end of the selected arm, whereby the corresponding arm is lowered, a neutralizer frame loosely mounted on the said shaft and adapted to be raised by the secured frame and adapted to engage the ends of any of the arms, and means whereby the neutralizer frame will be released from the secured frame and drop when the arms are in their normal alignment.

4. The mechanism included in claim 3, such mechanism comprising a spring held key slidable in the neutralizer frame, one end of the same normally impinging against the upper edge of the secured frame, and a trip positioned to engage the key to pull the same from contact with the secured frame at a predetermined point.

5. In a gear shifting mechanism including a pair of shafts, arms on each shaft, the arms on one shaft being gear connected with the corresponding arms on the other shaft, means for selecting any of said arms, a frame secured to one of the shafts transversely of the arms and carrying the selecting means therein and adapted to be moved to engage the end of the selected arm, whereby the corresponding arm is moved in the opposite direction, a neutralizer frame loosely mounted on the said shaft and adapted to be moved by the secured frame to engage the ends of any of the arms, a spring actuated slidable member in the neutralizer frame, normally impinging against the upper edge of the secured frame, a trip secured to the casing in which the mechanism is mounted and adapted to engage said slidable member to pull the same from contact with the secured frame at a predetermined point whereby the neutralizer frame will be released and will drop back under the secured frame at such point, and a trip on the secured frame adapted to engage the other side of the slidable member to pull the same and allow the secured frame to pass by when returning to its normal position.

In testimony whereof I affix my signature.

BENJAMIN F. SCHMIDT.